United States Patent [19]

Shikata et al.

[11] 3,772,146

[45] Nov. 13, 1973

[54] NOVEL METHOD OF PRODUCING RADIOACTIVE IODINE

[75] Inventors: Eiji Shikata; Hiroshi Amano, both of Oaza Funaishikawa, Japan

[73] Assignee: Japan Atomic Energy Research Institute, Tokyo, Japan

[22] Filed: Mar. 17, 1971

[21] Appl. No.: 125,337

[30] Foreign Application Priority Data

Mar. 23, 1970 Japan................................ 45/23537

[52] U.S. Cl.............. 176/16, 252/301.1 R, 423/249
[51] Int. Cl............................................. G21g 1/00
[58] Field of Search .................. 176/10, 16, 14, 13; 423/249; 252/301.1 R

[56] References Cited
UNITED STATES PATENTS 3,226,298  12/1965  Gemmill................................ 176/10
2,942,943  6/1960  Greene et al..................... 176/10 X
3,053,644  9/1962  Huising.................................. 23/294
3,179,568  4/1965  Hatzopoulous....................... 176/14
3,282,655  11/1966  Case .................................. 176/10 X

FOREIGN PATENTS OR APPLICATIONS 955,394  5/1964  Great Britain........................ 176/10

Primary Examiner—Harvey E. Behrend
Attorney—Stevens, Davis, Miller & Mosher

[57] ABSTRACT

Radioactive iodine (I-131) is easily obtained by heating, at a temperature preferably ranging from 400° to 700°C, tellurium trioxide which was irradiated with a neutron flux. Thus, the complicated operations required in a conventional process for separation and/or purification of the product are eliminated.

8 Claims, No Drawings

NOVEL METHOD OF PRODUCING RADIOACTIVE IODINE

BACKGROUND OF THE INVENTION

1. Field of the Invention

This invention relates to the method of producing radioisotope of iodine, I-131, from tellurium trioxide irradiated by a neutron flux.

Description of the Prior Art

Radioisotope of iodine, I-131 (hereinafter referred to as I-131), has so far been produced from metallic tellurium or tellurium dioxide irradiated by a neutron flux. That is, when tellurium is exposed, for a suitable period of time, to a neutron flux from a nuclear reactor, a particle accelerator or other neutron sources, the isotope of tellurium, Te-130, which is contained in tellurium in the proportion of 34.49 percent, is converted to radioactive tellurium, Te-131; and this radioactive material is converted to I-131 with spontaneous emission of $\beta$-particles. The technical difficulty in the application of the above method resides in the complicated separation process in which pure I-131 in the useful form is to be separated from a tellurium starting material.

Either the wet method or dry method has so far been used for the separation process. With the wet method metallic tellurium powder was, at first, used as the starting material. This material is irradiated by means of a neutron beam in a nuclear reactor, and then, dissolved in a mixture comprising conc. sulfuric acid and chromium (VI) oxide. A very vigorous reaction takes place upon the dissolution, and the tellurium is converted to telluric acid and the iodine (I-131) to iodic acid. By adding oxalic acid to the above solution, elemental iodine is obtained from iodic acid and is separated by means of distillation. The I-131 thus obtained is heavily contaminated by the reagents which are used in a large amount in the above process and therefore a further refining process is required. The above problem was partly solved by using telluric acid, which is soluble in water or mineral acid, as starting material. [R. Constant, Journal of Inorganic and Nuclear Chemistry, vol. 7 p133-139,(1958) ]. The use of telluric acid makes the separation process fairly simple. However, the stability of telluric acid is low at high temperatures. This is a large defect in irradiation in a nuclear reactor; that is, it is feared that the material decomposes while it is irradiated and the container for irradiation bursts owing to the increase of internal pressure by the generation of gases accompanying the decomposition. On the other hand, with the dry method (reported by K. Taugbol and J.B. Dahl in JENER REPORT No. 52), I-131 is separated from the irradiated powder of tellurium dioxide by means of distillation at a temperature ranging from 680°-700°C in an air or oxygen stream. This process does not require complicated dissolution and separation process which require a large quantity of reagents, and the apparatus and the operations are simplified; however, this method has an unavoidable defect in that the final product, distilled I-131, is contaminated by the tellurium dioxide volatilized together with I-131. The distillation temperature should be high in order to separate I-131 from the powder with high efficiency; but at the same time, tellurium dioxide volatilizes actively, and thereby the purity of the distilled I-131 is lowered.

SUMMARY OF THE INVENTION

The present inventors have unexpectedly found that the various problems mentioned above can be solved by using tellurium trioxide as starting material and have completed a new and excellent process for producing I-131. The present invention is characterized in that the irradiated tellurium trioxide is, on heating, converted to tellurium dioxide or to an intermediate between tellurium trioxide and tellurium dioxide according to temperature of heating and therefore the formed I-131 can be easily separated from the source material, although it is difficult to separate the formed I-131 at a low temperature because this species is included in the crystal lattice of the irradiated tellurium trioxide.

It is well known that radioisotope of iodine I-131 is very useful for the labelled compound, especially for the medical use.

The object of this invention is to remove the defects which reside in the conventional methods using metallic tellurium or tellurium dioxide or telluric acid as starting material, by utilizing tellurium trioxide instead.

Tellurium trioxide does not substantially change chemically at a temperature lower than 400°C, and has sufficient stability under irradiation by the nuclear reactors usually used for research. The temperature characteristics of the material result in a large advantage over telluric acid which decomposes at about 110°C. Simultaneously with the decomposition of tellurium trioxide which substantially begins at about 400°C, I-131 begins to be released rapidly. The advantage of this method is that the I-131 can be recovered with high recovery ratio in a short time at a much lower temperature than is required with the dry method using tellurium dioxide. (Actually, it is suitable to heat at about 450°C in order to promote the release of I-131 from the irradiated tellurium trioxide in the decomposition reaction.), and moreover, that the low volatilization temperature keeps tellurium away from its vaporization which was a problem in the conventional methods. In the present invention, I-131 released can be recovered by a conventional means. For example, air is used as a carrier gas to carry I-131 released from the irradiated tellurium trioxide, to a gas absorbing bottle. The carrier gas is not restricted to only air, and other suitable gases may be used for this purpose.

The dry method does not require a large amount of reagents as does the dissolution of irradiated material in the wet method, and its processes, apparatus and operations are much simpler than those of wet method. Furthermore, the use of tellurium trioxide which releases I-131 at lower temperature enhances still more the advantages of the dry method.

In the present invention, the neutron flux density and irradiation time are not especially restricted. One skilled in the art can easily determine a suitable irradiation period of time according to the neutron flux density to be employed so that Te-130 be substantially converted to Te-131. In case it is feared that the temperature will rise as high as the decomposition temperature of tellurium trioxide by employing a large flux density (e.g., $3 \times 10^{14} n/cm^2.sec$ or more), it may be necessary to cool the material in the course of irradiation. The period of time required for the decomposition of tellurium trioxide depends on the temperature, the amount of the material and the surface area of the material to be treated. The temperature ranges from the decomposition temperature (about 400°C) to about 750°C, and generally a temperature of about 450°C is employed.

DESCRIPTION OF THE PREFERRED EMBODIMENTS

According to the present invention, tellurium trioxide is exposed to a neutron flux of a suitable intensity for a suitable period of time (Irradiation in a nuclear reactor may be convenient from the view point of effective use of neutron flux.), then it is charged in a quartz tube. One end of the quartz tube is connected to a gas absorbing bottle which contains an aqueous alkaline solution such as sodium hydroxide aqueous solution with a suitable concentration, the other end being connected to a pump which supplies air to the tube. While air is supplied by means of the pump to the quartz tube, the surface of tellurium trioxide and the gas absorbing bottle in order, the tellurium trioxide is heated to above its decomposition temperature (about 400°C), preferably to about 450°C, and held at that temperature for about 1 hour by an electric furnace or the like. The final product, I-131, is recovered from the gas absorbing bottle in the form of sodium iodide aqueous solution. In this process, 80 percent of the formed I-131 in the irradiated tellurium trioxide is recovered after first 30 min. and 90 percent is recovered after the first hour. When the temperature is held at 450°C, no contamination of the final product by volatilized tellurium dioxide is detected. I-131 can be separated by heating, without contamination even above 450°C, but above 700°C the amount of volatilized tellurium dioxide becomes considerable in the same way as in the case for tellurium dioxide.

As mentioned above, I-131 is formed in the irradiated tellurium trioxide by means of irradiation with a neutron flux. However, the formed I-131 can not be released at a temperature lower than about 400°C since its atoms are included in the crystal lattice of the tellurium trioxide (having a characteristic arrangement consisting of the atoms of oxygen and tellurium which are the constituents of this compound). When the tellurium trioxide is heated, it begins to decompose at about 400°C and is converted to tellurium dioxide or to an intermediate between tellurium trioxide and tellurium dioxide with the release of oxygen. The crystal structure of the tellurium trioxide is transformed to that of tellurium dioxide, and at the same time the atoms of I-131 are released from the former lattice. The release of I-131 is made rapidly, since it follows the decomposition at comparatively low temperature and the resulting transition of the crystal structure is as mentioned above. On the other hand, when tellurium dioxide is used as starting material, the decomposition and the transition of the crystal structure mentioned above do not take place up to its melting point, about 800°C; so the atoms of I-131 included in the crystal lattice of tellurium dioxide are released only by diffusion in solid phase, that is, the atoms from within the crystal lattice in which the concentration of I-131 is higher are transferred to the surface at which the concentration be lower. The rate of the release of I-131 increases with increase in temperature, but the important disadvantage is that the distilled I-131 is contaminated by the volatilization of tellurium dioxide which results from the heating of the irradiated dioxide at a high temperature at which a high rate of release of I-131 is sufficiently obtained for practical purpose.

The present invention will further be explained hereinafter with reference to the examples.

EXAMPLE 1

One gram of tellurium trioxide was enclosed in a quartz tube 0.8 cm in diameter and 5 cm in length, and the tube was placed in a cylindrical aluminum container 2.5 cm in diameter and 11.4 cm in length, for irradiation. The enclosed material was irradiated by a neutron flux with the density of $3 \times 10^{13}$ n/cm$^2$/sec for 10 days in heavy water-cooled CP-5 type reactor which was operated with the output of 10 MW. After the irradiation, the irradiated material was taken out and inserted into a quartz tube 2.0 cm in diameter which was then positioned at the center of a cylindrical electric furnace. One end of the quartz tube was connected to a gas absorbing bottle containing 20 ml of 0.5 percent sodium hydroxide aqueous solution. An air pump was connected to the other end of the tube and air was blown in the direction of the gas absorbing bottle through the heating zone (wherein tellurium trioxide is placed) at the flow rate of 50 cc/min. The material was held at 450°C for 1 hour in the furnace. By this process, 90 percent of the I-131 in the irradiated material was recovered in the form of sodium iodide aqueous solution in the gas absorbing bottle. Thus, there was obtained I-131 corresponding to the radioactivity of 50 mCi when it was taken out from the reactor. No tellurium was detected in the final product.

EXAMPLE 2

One gram of tellurium trioxide was molded under pressure into a tablet 1.5 cm in diameter and 0.5 cm in thickness, and the tablet was put in a cylindrical aluminum container 2.5 cm in diameter and 11.4 cm in length, for irradiation. The enclosed material was irradiated by a neutron flux with the density of $3 \times 10^{13}$ n/cm$^2$/sec for 10 days in a NRX-type reactor which was operated with the output of 10 MW. After irradiation, the irradiated material was taken out and treated in the same way as in Example 1. By this process, 70 percent of I-131 in the irradiated material was obtained, which corresponds to the radioactivity of 39 mCi when it was taken out from the reactor.

What we claim is:

1. A process for irradiating radioactive iodine (I-131) comprising
   irradiating tellurium trioxide
   with a neutron flux to form I-131,
   decomposing the irradiated tellurium trioxide by heating same at a temperature from its decomposition temperature to about 750°C to effectuate the release of I-131, and
   collecting the released I-131.

2. The process of claim 1 wherein said irradiated tellurium trioxide is recovered by an I-131 absorbent.

3. The process of claim 1 wherein the heating of said irradiated tellurium trioxide is carried out in a gas stream which is chemically inert to I-131 and tellurium trioxide.

4. The process of claim 1 wherein said heating temperature ranges from about 400°C to about 700°C.

5. A process as set forth in claim 1, in which the irradiation is effected in a nuclear reactor.

6. A process as set forth in claim 1, in which the tellurium trioxide is cooled in the course of irradiation.

7. A process as set forth in claim 2, in which said absorbent is an aqueous alkaline solution.

8. A process as set forth in claim 2, in which I-131 released from the irradiated tellurium trioxide is recovered by using a carrier gas.

* * * * *